US012630445B2

(12) United States Patent
Trivelli et al.

(10) Patent No.: US 12,630,445 B2
(45) Date of Patent: May 19, 2026

(54) WATER DESALINATION DEVICE AND METHOD

(71) Applicant: 77 VISION WAY LTD, Belfast (GB)

(72) Inventors: Gianpaolo Trivelli, Pavia (IT); Gianluigi Trivelli, Pavia (IT); Mauro Gazzelli, Lugano-Aldesago (CH); Claudio Raggi, Terni (IT)

(73) Assignee: 77 VISION WAY LTD, Belfast (GB)

( * ) Notice: Subject to any disclaimer, the term of this patent is extended or adjusted under 35 U.S.C. 154(b) by 244 days.

(21) Appl. No.: 18/563,475

(22) PCT Filed: May 25, 2022

(86) PCT No.: PCT/IB2022/054872
§ 371 (c)(1),
(2) Date: Nov. 22, 2023

(87) PCT Pub. No.: WO2022/249075
PCT Pub. Date: Dec. 1, 2022

(65) Prior Publication Data
US 2024/0246836 A1 Jul. 25, 2024

(30) Foreign Application Priority Data

May 25, 2021 (IT) ........................ 102021000013625

(51) Int. Cl.
C02F 1/04 (2023.01)
B01D 1/00 (2006.01)
(Continued)

(52) U.S. Cl.
CPC ............ C02F 1/043 (2013.01); B01D 1/0005 (2013.01); B01D 3/10 (2013.01); C02F 2103/08 (2013.01);
(Continued)

(58) Field of Classification Search
CPC .......... C02F 1/043; B01D 1/0005; B01D 3/10
See application file for complete search history.

(56) References Cited

U.S. PATENT DOCUMENTS 3,783,108 A * 1/1974 Koivisto ............ B01D 19/0068
203/91
4,219,387 A * 8/1980 Gruntman ................. C02F 1/14
210/918
(Continued)

FOREIGN PATENT DOCUMENTS

DE 2610403 A1 9/1977
DE 19603445 A1 8/1996
(Continued)

OTHER PUBLICATIONS

European Patent Office, International Search Report for PCT/IB2022/054872, Sep. 14, 2022, EPO, P.B. 5818 Patentlaan 2, NL—2280 HV Rijswijk. (Uploaded to USPTO on Nov. 22, 2023.).
(Continued)

*Primary Examiner* — Jonathan Miller
(74) *Attorney, Agent, or Firm* — Underwood & Associates, LLC

(57) ABSTRACT

A water desalination device, comprising:
  a body having a lateral wall and defining a cavity for the desalination of water, wherein in said cavity are defined a desalination chamber and a condensation chamber, wherein the condensation chamber comprises a collection portion for desalinated water,
  a heater, configured to heat the water to desalinate in order to produce a steam,
  a cooler, configured to determine a condensation of a steam deriving from the heating of the water,
(Continued)

wherein
 the heater comprises a duct within which flows seawater at a first temperature (T1),
 the cooler comprises a duct within which flows seawater at a second temperature (T2),
wherein said water desalination device is configured to maintain a pressure lower with respect to the atmospheric one within said cavity, and is operatively connected with a vacuum pump connected with said cavity, said water desalination device comprising a first supply device configured to supply seawater at said first temperature (T1) into the duct of the heater, and a second supply device configured to supply seawater at said second temperature (T2) into the duct of the cooler.

14 Claims, 3 Drawing Sheets

(51) Int. Cl.
 *B01D 3/10* (2006.01)
 *C02F 103/08* (2006.01)
(52) U.S. Cl.
 CPC .... *C02F 2201/009* (2013.01); *C02F 2303/10* (2013.01)

(56) References Cited

U.S. PATENT DOCUMENTS

| | | | | | |
|---|---|---|---|---|---|
| 4,302,297 | A | * | 11/1981 | Humiston | C02F 1/16 |
| | | | | | 202/205 |
| 4,363,703 | A | * | 12/1982 | ElDifrawi | C02F 1/14 |
| | | | | | 202/180 |
| 4,504,362 | A | * | 3/1985 | Kruse | F03G 6/065 |
| | | | | | 202/180 |
| 4,555,307 | A | * | 11/1985 | Hagen | F04B 19/027 |
| | | | | | 202/205 |
| 5,439,560 | A | | 8/1995 | Kurematsu | |
| 5,513,494 | A | * | 5/1996 | Flynn | C02F 1/04 |
| | | | | | 48/77 |

| | | | | | |
|---|---|---|---|---|---|
| 6,303,006 | B1 | * | 10/2001 | Chang | B01D 3/10 |
| | | | | | 202/205 |
| 6,656,326 | B2 | * | 12/2003 | Nagler | B01D 3/42 |
| | | | | | 202/241 |
| 7,052,582 | B2 | * | 5/2006 | Madkour | B01D 1/22 |
| | | | | | 202/205 |
| 7,608,171 | B2 | * | 10/2009 | Otukol | B01D 1/22 |
| | | | | | 202/172 |
| 8,893,496 | B2 | * | 11/2014 | Ramamurthy | C02F 1/04 |
| | | | | | 60/641.7 |
| 9,771,278 | B2 | * | 9/2017 | Haynes | B01D 1/0035 |
| 10,294,122 | B2 | * | 5/2019 | Ohkawara | B01D 1/2887 |
| 2004/0016631 | A1 | * | 1/2004 | Madkour | B01D 1/16 |
| | | | | | 203/11 |
| 2004/0055866 | A1 | * | 3/2004 | Levine | B01D 1/28 |
| | | | | | 202/205 |
| 2010/0050636 | A1 | | 3/2010 | Ramamurthy | |
| 2013/0291532 | A1 | | 11/2013 | Chen | |
| 2014/0021031 | A1 | * | 1/2014 | Koivusaari | C02F 1/041 |
| | | | | | 202/185.1 |
| 2015/0266750 | A1 | * | 9/2015 | Abdeen | B01D 5/006 |
| | | | | | 202/234 |
| 2016/0083266 | A1 | * | 3/2016 | Ohkawara | B01D 1/2887 |
| | | | | | 202/177 |
| 2016/0368784 | A1 | * | 12/2016 | Haynes | B01D 1/305 |

FOREIGN PATENT DOCUMENTS

| | | |
|---|---|---|
| EP | 0487813 A2 | 6/1992 |
| FR | 1017954 A | 12/1952 |

OTHER PUBLICATIONS

European Patent Office, Written Opinion of the International Searching Authority for PCT/IB2022/054872, Sep. 14, 2022, EPO, P.B. 5818 Patentlaan 2, NL—2280 HV Rijswijk. (Uploaded to USPTO on Nov. 22, 2023).
European Patent Office, Search Strategy of the International Searching Authority for PCT/IB2022/054872, Sep. 14, 2022, EPO, P.B. 5818 Patentlaan 2, NL—2280 HV Rijswijk. (Uploaded to USPTO on Nov. 22, 2023.).

* cited by examiner

WATER DESALINATION DEVICE AND METHOD

TECHNICAL FIELD

The present disclosure relates to the water treatment field and in detail concerns a water desalination device.

The present disclosure relates also to a method for water desalination.

BACKGROUND

The water desalination is a process of removing the saline fraction from waters containing salt. In particular, seawaters are known to contain salt. The purpose of water desalination is to remove part or substantially all of the salt fraction from the water in order to obtain water with a low salt content. The desalinated water is typically used for food or industrial use as cooling water. The device used for water desalination is called desalinator.

It is known that in determined locations, seawater desalination is used to distribute the desalinated water in urban water systems for distribution to buildings. Typically, the places where seawater is desalinated are places where there is a shortage of water coming from other sources, typically non-saline, such as rivers or lakes or high altitude sources (meltwater from snowfields or glaciers).

The water desalination process can take place according to various techniques, among which there are desalination by permeation, desalination by ion exchange and desalination by evaporation. Depending on the amount of salt present in the water to be desalinated, the desalination can take place in a single step or, if necessary, in several consecutive steps, until reaching the desired desalination level.

The desalination by permeation is a process wherein the salt present in the water is extracted by means of separation on a semi-permeable membrane. A known process of desalination by permeation is the desalination by reverse osmosis.

The desalination by ion exchange takes place by removing Na+ and Cl− ions on particular types of resins. The desalination by ion exchange allows a significant reduction of the quantity of salt from the water already in the first step. The desalination by ion exchange, however, is only used for small-scale production of desalinated water.

The desalination by evaporation can be carried out using different known technologies. In any case, the desalination by evaporation uses a heat source to allow the transformation of the energy transferred to the water to be desalinated into latent heat of vaporization.

The Applicant notes that in general, water desalination processes are energy-consuming. The Applicant observes in particular that in determined areas wherein urban or industrial water supply, i.e. in large volumes, is carried out by desalination of seawater, the costs associated with this water supply are considerable.

PURPOSES

The purpose of the present disclosure is to describe a desalination device and method for seawater that allows to solve the above described drawbacks.

In particular, the purpose of the present disclosure is to describe a seawater desalination device and method which is energy efficient.

Another purpose of the present disclosure is to describe a water desalination device that is easy to install.

Another purpose of the present disclosure is to describe a water desalination device and method which can be used efficiently both when desalinating large volumes of water and when desalinating a reduced volume of water.

SUMMARY

According to the present disclosure, it is described a water desalination device (1), comprising:

a body having a lateral wall (2) and defining a cavity (2c, 2d) suitable for allowing the desalination of an amount of water (201) to desalinate by desalination, wherein in said cavity are defined a desalination chamber (2d) and a condensation chamber (2c), wherein the condensation chamber (2c) comprises a collection portion (109) destined to collect at least temporarily desalinated water (300), at least a heater (15c), configured to heat the amount of water (201) to desalinate present, in use, in the desalination chamber (2d), in order to produce a steam, a cooler (15e), configured to determine a condensation of a steam deriving from the heating of the water (201) to desalinate, wherein the heater (15c) comprises a duct within which, in use, flows seawater at a first temperature (T1), the cooler (15e) comprises a duct within which, in use, flows seawater at a second temperature (T2) lower with respect to said first temperature (T1), wherein said water desalination device (1) is configured to maintain a pressure lower with respect to the atmospheric one within said cavity, in particular within said desalination chamber (2d) and within said condensation chamber (2c), and is operatively connected with, optionally comprises, a vacuum pump (13) connected with said cavity and configured to create, in use, a predetermined vacuum within said cavity, said water desalination device (1) comprising at least a first supply device (301) configured to supply seawater at said first temperature (T1) into the duct of the heater (15c), and comprising a second supply device (302) configured to supply seawater at said second temperature (T2) into the duct of the cooler (15e).

According to another non-limiting aspect, said desalination is a desalination by evaporation.

According to another non-limiting aspect, the water (201) to desalinate is seawater.

According to another non-limiting aspect, the first supply device (301) is configured to withdraw seawater at a first depth (D1), in such a way that said seawater has said first temperature (T1) and the second supply device (302) is configured to withdraw seawater at second depth (D2), greater than the first depth (D1) so that such seawater has said second temperature (T2).

According to another non-limiting aspect, the water desalination device (1) is configured to desalinate water by heating up to evaporation.

According to another non-limiting aspect, the water desalination device (1) is configured to and specifically destined to operate exploiting the thermocline of the seawater.

According to another non-limiting aspect, said first depth (D1) and said second depth (D2) are substantially comprised in a thermocline range (D3-D4) of the seawater.

According to another non-limiting aspect, the cavity (2c, 2d) defines an environment isolated from the outside.

According to another non-limiting aspect, the first supply device (301) comprises a pump, and/or wherein the second supply device (302) comprises a pump.

According to another non-limiting aspect, the water desalination device (1) comprises an energy recovery device (400) configured to generate electric power from the wave motion and/or by height difference with respect to a sea floor (500f),
wherein the energy recovery device (400) is operatively connected with, and supplies electric power to, at least one between the first supply device (301) and the second supply device (302).

According to another non-limiting aspect, alternatively one between the body or the energy recovery device (400) is configured to be anchored to a sea floor (500f) in such a way to lie at a predetermined height with respect to said sea floor (500f) and wherein the other one between said energy recovery device (400) or the body is configured to lie at a height variable with respect to said sea floor (500f) and optionally is configured to float on the water in such a way to assume a height variable with respect to said sea floor (500f) and wherein the energy recovery device (400) is configured to generate electric energy from the wave motion and/or by height difference with respect to the sea floor (500f) by relative movement with respect to said body.

According to another non-limiting aspect, the water desalination device (1) is configured to desalinate seawater (201), and/or is configured to withdraw seawater and supply or allow to supply said seawater within said cavity (2c, 2d), in particular within said desalination chamber (2d).

According to another non-limiting aspect, at least the body of water desalination device (1) is configured to be connected with a retaining element (700) configured and specifically destined to allow at least to keep the body of the water desalination device (1) at a predetermined height or depth with respect to the sea floor (500f).

According to another non-limiting aspect, the water desalination device (1) is configured to be kept at a predetermined depth, optionally retained by said retaining element (700).

According to another non-limiting aspect, the retaining element (700) comprises a chain or rope.

According to another non-limiting aspect, the water desalination device (1) comprises an intermediate or separating element (100), positioned in an intermediate position of the cavity (2c, 2d) of the body, and having at least a portion of junction (103) in contact with the lateral wall (2), said intermediate or separating element (100) being configured to divide said cavity realizing the desalination chamber (2d) and the condensation chamber (2c).

According to another non-limiting aspect, the intermediate or separating element (100) comprises at least a through hole (105) configured to allow the passage of at least a steam deriving from the heating of the water to desalinate from the desalination chamber (2d) to the condensation chamber (2c).

According to another non-limiting aspect, the intermediate or separating element (100) comprises at least a collection portion (109) of desalinated water (300).

According to another non-limiting aspect, the portion of junction (103) comprises, optionally is, a seal wall (103) in substantial contact with the lateral wall (2) of the body.

According to another non-limiting aspect, the collection portion (109) of desalinated water is comprised between the lateral wall (2) and the lateral wall of collection (102).

According to another non-limiting aspect, said intermediate position is a predefined intermediate position and/or is a fixed intermediate position.

According to another non-limiting aspect, the first supply device (301) is configured to supply heat to the seawater supplied to the heater (15c).

According to another non-limiting aspect, the body comprises a head portion (3) and a bottom portion (4), wherein the head portion delimits at the top said body and wherein the bottom portion delimits at the bottom said body.

According to another non-limiting aspect, at least one between said head portion (3) and said bottom portion (4) comprises a closing element of the cavity (2c, 2d) of removable type, configured to allow the access of an operator and/or of a tool inside the cavity (2c, 2d), in particular inside at least the desalination chamber (2d) and/or the condensation chamber (2c).

According to another non-limiting aspect, the body is realized in a unique piece and/or the lateral wall (2) extends uninterruptedly for defining the desalination chamber (2d) and the condensation chamber (2c).

According to another non-limiting aspect, the body is realized in a first and a second piece, said first and said second piece being removably connectable and being configurable in a first joint configuration, or of use, wherein the first and second piece as a whole define said lateral wall (2).

According to another non-limiting aspect, the intermediate or separating element (100) comprises a head portion (101) comprising an upper wall substantially orthogonal with respect to the main axis (X).

According to another non-limiting aspect, the intermediate or separating element (100) comprises a head portion (101) comprising a lateral wall (104).

According to another non-limiting aspect, the lateral wall (104) is joined with the upper wall in substantial correspondence of an upper ending portion thereof.

According to another non-limiting aspect, the lateral wall (104) of the head portion (101) is aligned to the main axis (X) and/or extends along a direction parallel to the direction along which extends the portion of junction (103).

According to another non-limiting aspect, the at least a through hole (105) is positioned on said lateral wall (104).

According to another non-limiting aspect, the at least a through hole (105) is positioned in correspondence of the head portion (101).

According to another non-limiting aspect, the at least a through hole (105) presents an axis inclined with respect to the main axis (X), optionally presenting an axis substantially orthogonal with respect to the main axis (X).

According to another non-limiting aspect, the intermediate or separating element (100) is configured to determine, through the at least one through hole (105), a vaporization and condensation path (200) substantially curved and at least partially misaligned with respect to said main axis (X).

According to another non-limiting aspect, the collection portion (109) of desalinated water (300) lies at a height lower with respect to said head portion (101).

According to another non-limiting aspect, the lateral wall (2) is substantially tubular and develops along an own main axis (X) and said cavity (2c, 2d) develops along said main axis (X).

According to another non-limiting aspect, the main axis (X) is, in use, substantially vertical.

According to another non-limiting aspect, the portion of junction (103) comprises a seal wall, joined with the lateral wall of the body.

According to another non-limiting aspect, the portion of junction (103) comprises, optionally is, a seal wall (103) in substantial contact with the lateral wall (2) of the body.

According to another non-limiting aspect, the lateral wall of collection (102) is substantially inclined with respect to said portion of junction (103) and lies, in use, at least partially, optionally integrally, at a height higher with respect to the portion of junction (103).

According to another non-limiting aspect, the lateral wall of collection (102) is substantially inclined with respect to said seal wall (103) and lies, in use, at least partially, optionally integrally, at a height higher with respect to the seal wall (103).

According to another non-limiting aspect, the lateral wall of collection (102) is substantially inclined outwards and/or towards said lateral wall (2).

According to another non-limiting aspect, the lateral wall of collection (102) is inclined inwards and/or is leaned against or is in substantial contact with said lateral wall (2).

According to another non-limiting aspect, the collection portion (109) of desalinated water (300) has a substantially annular shape.

According to another non-limiting aspect, the collection portion (109) of desalinated water (300) lies in a radially central position of said intermediate or separating element (100).

According to another non-limiting aspect, the condensation chamber lies at a height higher with respect to the height at which lies the desalination chamber.

According to another non-limiting aspect, the water desalination device (1) comprises an auxiliary heater, positioned in substantial correspondence of the desalination chamber.

According to another non-limiting aspect, the auxiliary heater comprises a electrical resistance.

According to another non-limiting aspect, the auxiliary heater lies at a height substantially equal to the height in correspondence of which lies the heater (15c).

According to another non-limiting aspect, the heater (15c) assumes a spiral or coil shape.

According to another non-limiting aspect, the auxiliary heater assumes a spiral or coil shape.

According to another non-limiting aspect, the auxiliary heater is positioned within said spiral or coil realized by the heater (15c).

According to another non-limiting aspect, the auxiliary heater comprises interposed portions, in particular substantially positioned, in correspondence of portions of space vertically present between one turn and the next turn of the spiral or coil realized by the heater (15c), and is substantially aligned vertically to said heater (15c).

According to another non-limiting aspect, the intermediate element (100) comprises at least a first seal ring (108) configured to enter in substantial contact with said lateral wall (2), in particular determining a substantial insulation and/or separation of the desalination chamber (2d) from the condensation chamber (2c).

According to another non-limiting aspect, the intermediate element (100) comprises at least a first and a second seal ring (108), said first and said second seal ring (108) being each one configured to enter in substantial contact with said lateral wall (2), in particular determining a substantial insulation and/or separation of the desalination chamber (2d) from the condensation chamber (2c).

According to another non-limiting aspect, the first seal ring (108) is positioned in substantial correspondence of the portion of junction (103).

According to another non-limiting aspect, the second seal ring (108) is positioned in substantial correspondence of the portion of junction (103).

According to another non-limiting aspect, the first seal ring (108) is positioned in substantial correspondence of the seal wall (103).

According to another non-limiting aspect, the second seal ring (108) is positioned in substantial correspondence of the seal wall (103).

According to another non-limiting aspect, the first seal ring and the second seal ring (108) are positioned in substantial correspondence of the portion of junction (103).

According to another non-limiting aspect, the first seal ring and the second seal (108) are positioned in substantial correspondence of the seal wall (103).

According to another non-limiting aspect, the seal wall (103) extends substantially parallel to the main axis (X).

According to another non-limiting aspect, the seal wall (103) comprises at least a first recess (107), optionally annular, configured to house at least part of the seal ring (108).

According to another non-limiting aspect, the seal wall (103) comprises at least a first recess and a second recess (107), said first and said second recess being optionally annular, said first and said second recess (107) being configured, each one, to house at least parte respectively of the first seal ring (108) and of the second seal ring (108).

According to another non-limiting aspect, the head portion (101) comprises an upper wall substantially orthogonal with respect to the main axis (X).

According to another non-limiting aspect, the collection portion (109) of the desalinated water (300) is of a substantially annular shape.

According to another non-limiting aspect, the collection portion (109) presents an annularly tapered bottom and, in particular, presents a bottom zone and an upper zone, the bottom zone having an acute point with a transversal section smaller with respect to the transversal section of the upper zone.

According to another non-limiting aspect, the collection portion (109) comprises a bottom portion substantially planar and/or developing along a plane substantially orthogonal with respect to the main axis (X).

According to another non-limiting aspect, the intermediate or separating element (100) comprises a filtering membrane, configured to allow the passage of water steam and configured to retain solid residuals deriving from the water desalination process and prevent the passage of significant quantities of water in liquid form, in particular in drops or bubbles.

According to another non-limiting aspect, the filtering membrane comprises a plurality of substantially open passages or holes, configured to allow a passage of molecules of a size smaller than a predetermined size and, also, to determine an impairment to the passage of molecules of a size greater than or equal to that predetermined size.

According to another non-limiting aspect, the filtering membrane is positioned into the cavity (106) of the intermediate or separating element (100) and/or is positioned substantially in correspondence of the desalination chamber.

According to another non-limiting aspect, the filtering membrane is removably connected to the body of the intermediate or separating element.

According to another non-limiting aspect, the filtering membrane is realized in a non-hygroscopic material, optionally said non-hygroscopic material being a polymer material, in particular perfluorocarbon (PFC), more in particular polytetrafluoroethylene (PTFE), even more in particular Gore-Tex®.

According to another non-limiting aspect, the cavity (106) of the intermediate or separating element (100) comprises a labyrinth of distribution of the desalination steam that communicates with the at least one through hole (105).

According to another non-limiting aspect, the water desalination device (1) is configured to operate in a continuous desalination cycle, causing a heating of the water (201) to desalinate, the condensation of the steam deriving from the heating of the water (201) to desalinate and the extraction of the desalinated water (300) from the cavity (2c, 2d) substantially uninterruptedly.

According to another non-limiting aspect, the water desalination device (1) is configured to maintain a vacuum present in the cavity (2c, 2d) at a level equal to or higher than a certain threshold and/or is configured to maintain the pressure present in the cavity (2c, 2d) at a lower level with respect to the atmospheric pressure during the continuous desalination cycle.

According to another non-limiting aspect, the water desalination device (1) has an operating configuration of distribution of desalinated water (300), in which the desalinated water (300) collected in the collection portion (109) is made flow into an outlet duct (10).

According to another non-limiting aspect, said water desalination device (1) is configured to maintain within said cavity (2c, 2d) a predetermined vacuum level with respect to a predetermined threshold in the continuation of said operating configuration of distribution of desalinated water (300).

According to another non-limiting aspect, in the operating configuration of distribution of desalinated water, the inlet valve is in closed configuration.

According to another non-limiting aspect, the water desalination device (1) has an operating configuration of loading of water (201) to desalinate, in which the water (201) to desalinate is supplied into the desalination chamber through an inlet duct; said device (1) being configured to maintain within said cavity (2c, 2d) a predetermined level of vacuum with respect to a predetermined threshold in the continuation of said operating configuration of loading water (201) to desalinate.

According to another non-limiting aspect, in the continuous desalination cycle the operating configuration of loading of water (201) to desalinate and the operating configuration of distribution of desalinated water (300) take place in substantial time simultaneity.

According to another non-limiting aspect, the heater (15c) comprises an outlet (U1) configured to allow the discharge of seawater in use supplied to the heater (15c) through the first supply device (301).

According to another non-limiting aspect, the cooler (15e) comprises an outlet (U2) configured to allow the discharge of seawater in use supplied to the cooler (15e) through the second supply device (302).

According to another non-limiting aspect, the water desalination device (1) is configured to discharge the seawater outflowing from the outlet (U1) of the heater (15c) in the sea (500W).

According to another non-limiting aspect, the water desalination device (1) is configured to discharge the seawater outflowing from the outlet (U2) of the cooler (15e) in the sea (500W).

According to another non-limiting aspect, the water desalination device (1) is configured to discharge the seawater outflowing from the outlet (U1) of the heater (15c) in a collection container.

According to another non-limiting aspect, the water desalination device (1) is configured to discharge the seawater outflowing from the outlet (U2) of the cooler (15e) in a collection container.

According to the present disclosure it is herein described a method for water desalination, comprising:

a step of creation of vacuum inside a cavity (2c, 2d) of a body of a water desalination device (1) by means of a vacuum pump (13) operatively connected with said cavity (2c, 2d), the introduction of a determined quantity of water (201) to desalinate in a desalination chamber (2d) realized within said cavity (2c, 2d);

the heating of the water (201) to desalinate through a heater (15c) comprising a duct within which is, in use, seawater is made flow, wherein the heating comprises a supply within said heater (15c) of seawater withdrawn at a first temperature (T1) in such a way that the water (201) to desalinate contained within said desalination chamber (2d) can evaporate forming a steam deriving from the heating of the water to desalinate, said supply taking place by means of a first supply device (301), the condensation of the steam deriving from the heating of the water to desalinate through a cooling induced by a cooler (15e) comprising a duct within which is, in use, seawater is made flow, wherein the condensation comprises a supply within said cooler (15e) of seawater withdrawn at a second temperature (T2) lower than the first temperature (T1), said supply taking place through a second supply device (302), said condensation determining a collection of desalinated water (300) in a collection portion (109) of desalinated water (300) of the water desalination device (1).

According to another non-limiting aspect, the introduction of a determined quantity of water (201) to desalinate in the desalination chamber (2d) realized within said cavity (2c, 2d) comprises, or is, a step of introduction of seawater to desalinate in the desalination chamber (2d) realized within said cavity (2c, 2d).

According to another non-limiting aspect, the heating comprises the supply within said heater (15c) of seawater withdrawn at a first depth (D1) such that the seawater has said first temperature (T1), and wherein the condensation comprises the supply within said cooler (15e) of seawater withdrawn at a second depth (D2) such that the seawater has said second temperature (T2) lower with respect to the first temperature (T1).

According to another non-limiting aspect, wherein the supply of seawater within said heater (15c) and/or within said cooler (15e) comprises an activation of at least a pump configured to supply the seawater within the duct of the heater (15c) and/or the duct of the cooler (15e), optionally wherein the supply of seawater within said heater (15c) comprises the activation of a first pump and the supply of seawater within said cooler (15e) comprises the activation of a second pump.

According to another non-limiting aspect, the method comprises a step of power recovery from the wave motion and/or by difference of height with respect to a sea floor (500f) through an energy recovery device (400) operatively connected with, and supplying electric power to, at least one between the first supply device (301) and the second supply device (302).

According to another non-limiting aspect, the method comprises a relative movement between said body and said energy recovery device (400), to generate electric power from the wave motion by relative movement with respect to said body, said relative movement deriving alternatively from an anchoring of the energy recovery device (400) with the sea floor (500f) in such a way that the energy recovery device (400) lies at a predetermined height with respect to said sea floor (500f) and from a height variability assumed by the body with respect to said sea floor (500f), or from an anchoring of the body with the sea floor (500f) in such a way that the body lies at a predetermined height relative to the said sea floor (500f), and from a variability of height assumed by the energy recovery device (400) relative to said sea floor.

According to another non-limiting aspect, the heating of the water (201) to desalinate causes the passage of the steam deriving from the heating of the water to desalinate through an intermediate or separating element (100), positioned in an intermediate position of the cavity of the body, and having at least a portion of junction (103) in contact with said lateral wall (2), said intermediate or separating element (100) being configured to divide said cavity realizing the desalination chamber (2d) and the condensation chamber (2c),
in particular causing the passage of the steam of condensation in at least one through hole (105) of the intermediate or separating element (100) determining the passage of the steam deriving from the heating of the water to desalinate from the desalination chamber (2d) to the condensation chamber (2c),
wherein the steam deriving from the heating of the water to desalinate is collected in a collection portion (109) of desalinated water (300) of the intermediate or separating element (100).

According to another non-limiting aspect, the collection portion (109) is positioned within the cavity (2c, 2d) and the condensation of the steam deriving from the collection of desalinated water (300) determines a collection of desalinated water (300) in the collection portion (109) of desalinated water (300) present in a condensation chamber (2c) of said cavity (2c, 2d).

According to another non-limiting aspect, the desalination method comprises desalinating the water by heating until evaporation.

According to another non-limiting aspect, the water (201) is seawater and/or the introduction of a determined quantity of water (201) to desalinate in a desalination chamber (2d) realized within said cavity (2c, 2d) comprises the introduction of a determined quantity of seawater within desalination chamber (2d).

According to another non-limiting aspect, the method comprises desalinating the water exploiting the thermocline of the sea.

According to another non-limiting aspect, the heating comprises the supply into said heater (15c) of seawater withdrawn at a first depth (D1) such that the seawater has said first temperature (T1), and wherein the condensation comprises the supply into said cooler (15e) of seawater withdrawn at a second depth (D2) such that the seawater has said second temperature (T2) lower than the first temperature (T1).

According to another non-limiting aspect, said first depth (D1) and said second depth (D2) are substantially within a range of thermocline (D3-D4) of the seawater.

According to another non-limiting aspect, the method comprises anchoring at least the body of the water desalination device (1) so that at least the body of the desalination device (1) remains at a predetermined height or depth with respect to the sea floor (500f).

According to another non-limiting aspect, the predetermined height or depth with respect to the sea floor (500f) is below the surface of the water (W).

According to another non-limiting aspect, the method comprises providing an intermediate or separating element (100), in an intermediate position of the cavity (2c, 2d) of the body so that the cavity (2c, 2d) is divided between the desalination chamber (2d) and the condensation chamber (2c).

According to another non-limiting aspect, the method comprises a passage of at least a steam deriving from the heating of the water to desalinate from the desalination chamber (2d) to the condensation chamber (2c) through at least a through hole (105) of the intermediate or separating element (100).

According to another non-limiting aspect, the method comprises joining a portion of junction (103), in particular comprising a seal wall, con the lateral wall of the body.

According to another non-limiting aspect, the method comprises collecting a steam condensate deriving from the heating of the water (201) to desalinate in a collection portion (109) realized substantially between the lateral wall (2) and the collection wall (102).

According to another non-limiting aspect, the method comprises delimiting the cavity (2c, 2d) with a head portion (3) and a bottom portion (4).

According to another non-limiting aspect, the method comprises making the cavity (2c, 2d) openable by means of an openable closing element forming part of at least one between said head portion (3) and said bottom portion (4), to allow the access of an operator and/or a tool within the cavity (2c, 2d), in particular within at least the desalination chamber (2d) and/or the condensation chamber (2c).

According to another non-limiting aspect, the method comprises causing the steam deriving from the heating of the water (201) to desalinate pass in at least a through hole (105) of the intermediate or separating element (200) having an axis inclined with respect to the main axis (X), optionally an axis substantially orthogonal with respect to the main axis (X) of the cavity (2c, 2d).

According to another non-limiting aspect, the passage of the steam deriving from the heating of the water (201) to desalinate determining a vaporization and condensation path (200) substantially curved and at least partially misaligned with respect to said main axis (X) of the cavity (2c, 2d).

According to another non-limiting aspect, the method comprises collecting a steam condensate deriving from the heating of the water (201) to desalinate in a collection portion (109) positioned at a height lower with respect to the head portion (101).

According to another non-limiting aspect, the method comprises collecting at least part of the steam condensate deriving from the heating of the water (201) to desalinate along a lateral wall of collection (102) of the intermediate or separating element (100) which is substantially inclined with respect to said junction portion (103) and lies, in use, at least partially, optionally integrally, at a height greater with respect the junction portion (103).

According to another non-limiting aspect, the method comprises collecting at least part of the steam condensate deriving from the heating of the water (201) to desalinate along a lateral wall of collection (102) of the intermediate or separating element (100) that lies substantially inclined outwardly and/or towards said lateral wall (2).

According to another non-limiting aspect, the method comprises collecting at least part of the steam condensate deriving from the heating of the water (201) to desalinate along a lateral wall of collection (102) of the intermediate or separating element (100) which is inclined inwards and/or is leaned against or is in substantial contact with said lateral wall (2).

According to another non-limiting aspect, the method comprises collecting at least part of the steam condensate deriving from the heating of the water (201) to desalinate in a collection portion (109) of desalinated water (300) having a substantially annular shape.

According to another non-limiting aspect, the method comprises collecting at least part of the steam condensate deriving from the heating of the water (201) to desalinate in a collection portion (109) of desalinated water (300) which lies in a radially central position of said intermediate or separating element (100).

According to another non-limiting aspect, the method comprises heating the water (201) to desalinate by means of an auxiliary heater, positioned in substantial correspondence of the desalination chamber.

According to another non-limiting aspect, the method comprises heating the water (201) to desalinate by means of an auxiliary heater comprising an electrical resistance.

According to another non-limiting aspect, the method comprises heating the water (201) to desalinate by means of an auxiliary heater that lies at a height substantially equal to the height in correspondence of which lies the heater (15c).

According to another non-limiting aspect, the method comprises positioning the auxiliary heater inside said spiral or coil realized by the heater (15c).

According to another non-limiting aspect, the method comprises positioning portions of the auxiliary heater in correspondence of portions of space vertically present between one turn and the next turn of the spiral or coil realized by the heater (15c), vertically aligning the auxiliary heater to said heater (15c).

According to another non-limiting aspect, the method comprises positioning at least a first seal ring (108) of the intermediate element (100) in substantial contact with said lateral wall (2), in particular determining a substantial insulation and/or separation of the desalination chamber (2d) from the condensation chamber (2c).

According to another non-limiting aspect, the method comprises an additional step of heating of the seawater flowing through the heater (15c), wherein the step of additional heating takes place:

by compression and/or pressure caused by the first supply device (301), and/or by means of a step of activation of a secondary heater, in particular of a secondary heater of the first power supply device (301).

According to another non-limiting aspect, the method comprises positioning at least a first seal ring (108) and a second seal ring (108) of the intermediate element (100) in substantial contact with said lateral wall (2), in particular determining a substantial insulation and/or separation of the desalination chamber (2d) from the condensation chamber (2c).

According to another non-limiting aspect, the method comprises a housing of the at least a first seal ring (108) in substantial correspondence of a first recess (107), optionally annular, configured to house at least part of the seal ring (108).

According to another non-limiting aspect, the method comprises collecting a steam condensate deriving from the heating of the water (201) in correspondence of an annularly tapered bottom of the collection portion (109) and, in particular, in correspondence of a bottom zone of the collection portion (109) different from an upper zone of the collection portion (109), the bottom zone having an acute point having a transversal section smaller with respect to the transversal section of the upper zone.

According to another non-limiting aspect, the method comprises collecting a steam condensate deriving from the heating of the water (201) in correspondence of a bottom portion of the collection portion (109) which is substantially planar and/or develops along a plane substantially orthogonal with respect to the main axis (X).

According to another non-limiting aspect, the method comprises causing the steam deriving from the heating of the water (201) to desalinate pass through a filtering membrane of the intermediate or separating element (100), the passage determining a passage of water steam through the filtering membrane and a retaining on said filtering membrane of solid residuals deriving from the water heating process, preventing the passage of significant quantities of water in liquid form, in particular in drops or bubbles.

According to another non-limiting aspect, the method comprises causing the steam deriving from the heating of the water (201) to desalinate pass through a plurality of ways or holes substantially open of the filtering membrane, allowing a passage of molecules of a size smaller than a predetermined size and, also, preventing the passage of molecules of a size greater than or equal to said predetermined size.

According to another non-limiting aspect, the method comprises a positioning of the filtering membrane within the cavity (106) of the intermediate or separating element (100) and/or in substantial correspondence of the desalination chamber.

According to another non-limiting aspect, the method comprises a removable positioning of the filtering membrane on or into the intermediate or separating element.

According to another non-limiting aspect, the filtering membrane is realized in a non-hygroscopic material, optionally said non-hygroscopic material being a polymer material, in particular perfluorocarbon (PFC), more in particular polytetrafluoroethylene (PTFE), even more in particular Gore-Tex®.

According to another non-limiting aspect, the method comprises causing the steam deriving from the heating of the water (201) to desalinate to pass through a steam distribution labyrinth deriving from the heating of the water (201), said labyrinth being part of the cavity (106) of the intermediate or separating element (100) and communicating with the at least one through hole (105).

According to another non-limiting aspect, the method comprises an extraction of the desalinated water (300) from said cavity (2c, 2d).

According to another non-limiting aspect, the method for water desalination is a method for water desalination with continuous cycle, wherein the heating of the water (201) to desalinate, the condensation of the steam deriving from the heating of the water (201) to desalinate and the extraction of the desalinated water (300) from the cavity (2c, 2d) take place substantially uninterruptedly.

According to another non-limiting aspect, in the method for water desalination with continuous cycle, the vacuum present in the cavity (2c, 2d) is maintained equal to or higher than a determined threshold and/or the pressure present in the cavity (2c, 2d) is maintained at a lower level with respect to the atmospheric pressure.

According to another non-limiting aspect, the method comprises a step of discharge of the seawater supplied to the heater (15c) via the first supply device (301), said step of discharge taking place by means of an outlet (U1) of the heater (15c).

According to another non-limiting aspect, the method comprises a step of discharge of the seawater supplied to the cooler (15e) via the second supply device (302), said step of discharge taking place by means of an outlet (U1) of the cooler (15e).

According to another non-limiting aspect, the step of discharge comprises the discharge of said seawater outflowing from the outlet (U1) of the heater (15c) in the sea (500W).

According to another non-limiting aspect, the step of discharge comprises the discharge of said seawater outflowing from the outlet (U2) of the cooler (15e) in the sea (500W).

According to another non-limiting aspect, the step of discharge comprises the discharge of said seawater outflowing from the outlet (U1) of the heater (15c) in a collection container.

According to another non-limiting aspect, the step of discharge comprises the discharge of said seawater outflowing from the outlet (U2) of the cooler (15e) in a collection container.

FIGURES

The object of the present disclosure will now be described in some preferred and non-limiting embodiments which are described with reference to the attached figures. A brief description of these figures is provided below.

DETAILED DESCRIPTION

Figure 1:
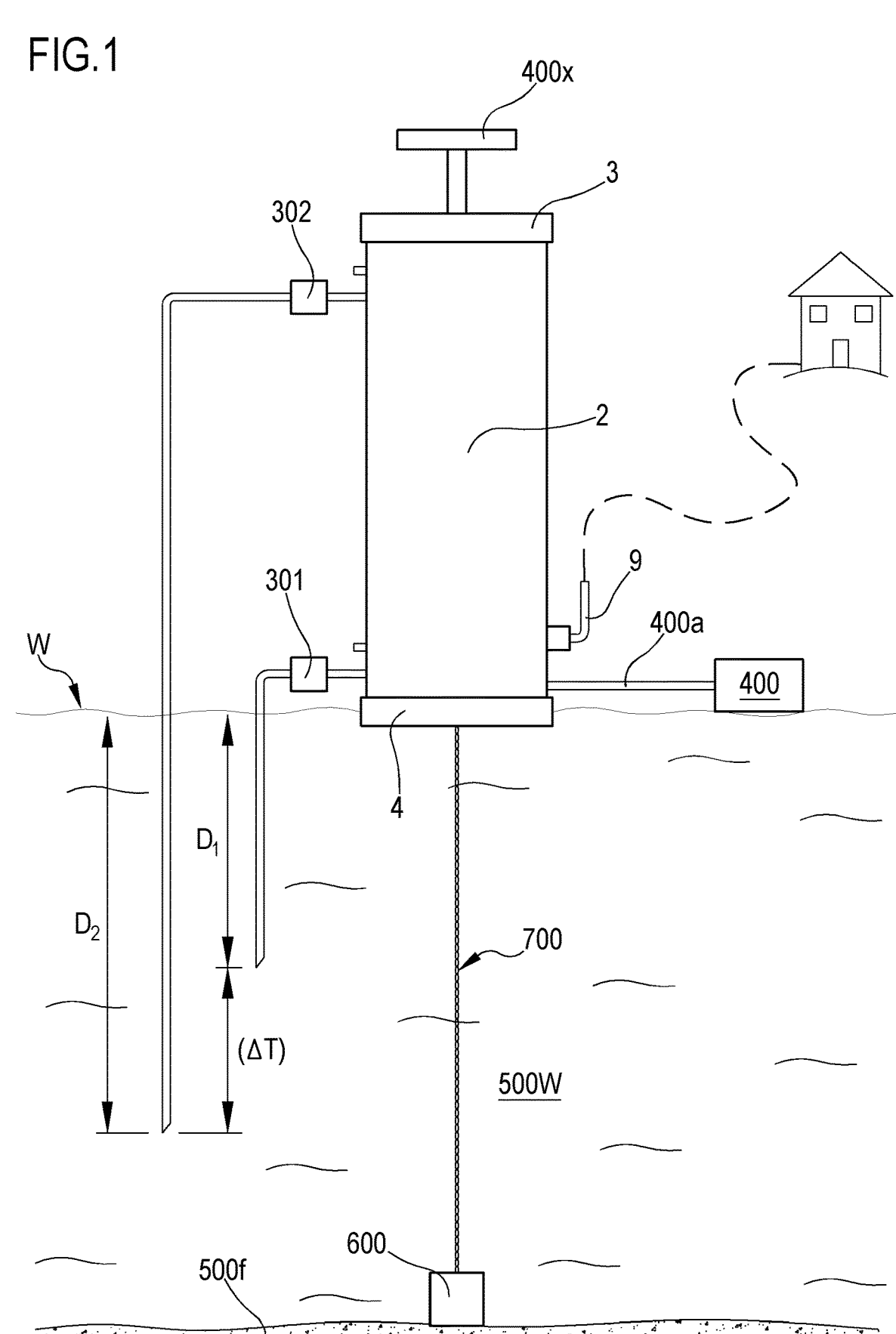
FIG. 1 shows a schematic view of a water desalination device according to the present disclosure.

With reference number 1 is indicated a water desalination device 1 as a whole. In particular, the water desalination device 1 is a vacuum desalination device, configured to carry out the desalination of water at a pressure lower with respect to the atmospheric pressure. The Applicant observes that certain features of the water desalination device 1 described therein can also be applied to water desalination devices operating at atmospheric pressure. For this reason, the specific use configuration of vacuum desalination should not be intended in a limiting manner.

In order to carry out the desalination of water, the water desalination device 1 comprises a body having a lateral wall 2 which defines at least a cavity 2c, 2d suitable for allowing the desalination of an amount of water 201 to desalinate.

In particular, in a non-limiting embodiment, the body is integral and the lateral wall 2 defines a first and a second portion of the body that in use constitute a desalination chamber 2d and a condensation chamber 2c.

In an embodiment, the body is delimited at the top by a head portion 3 and is delimited at the bottom by a bottom portion 4. Preferably, but in a non-limiting extent, at least one between the head portion 3 and the bottom portion 4 comprises a closing element of the cavity 2c, 2d of a removable type. Specifically, the closing element allows to an operator, or at least a tool, to access the interior of the desalination chamber 2d and of the condensation chamber 2c in such a way that they can be in use cleaned. This advantageously allows cleaning the lateral wall 2 and the other elements that are present in the cavity 2c, 2d after a determined period of use. In particular, this allows withdrawing from cavity 2c, 2d the salt that remains after the desalination process. In a non-limiting embodiment, the closing element comprises a ring that can be closed by means of a clamp, and such ring is arranged along a plane substantially orthogonal with respect to the main axis X.

At least a support is fixed to a base 5 of the water desalination device 1, in order to maintain the body, in particular at least the bottom portion 4, aligned along a predetermined direction in use substantially vertical and/or in order to maintain said body and in particular the bottom portion 4 spaced with respect to the base 5. In a preferred but non-limiting embodiment, the support 6 advantageously comprises at least a support column, preferably but not limited thereto realized in anodized aluminum. The use of anodized aluminum is in particular suitable for the marine environment.

The use of a body with substantial axial development allows to realize a very compact and aesthetically 'clean' structure, and—it is observed—of particular efficiency, in particular since thermal convection substantially moves the fluids along a vertical path, so that both heating and condensation of water take place efficiently. The Applicant observes that the particular compactness of the water desalination device 1 is also useful due to the specific marine application, as will be better described hereinafter.

The use of a body with substantial axial development advantageously allows also realizing a water desalination device of particular compactness, especially in the transversal direction. The use of a body with substantial axial development, particularly when—as in the case of the preferred embodiment described therein—this axial development is vertically oriented, favours the coupling of the body to further technical elements in an overall compact structure.

At least the bottom portion 4 is openable. Preferably, the head portion 3 is also openable. Thanks to this technical feature it is possible to carry out a cleaning of the cavity 2c, 2d defined by the lateral wall, in particular to carry out a cleaning of the portion of said cavity 2c, 2d defining the desalination chamber. In this way, it is possible to remove the solid residuals formed following the completion of the water desalination 201.

The Applicant observes that different types of materials can be used to realize the body, and in particular the lateral wall 2. However, preferably, the lateral wall must be realized in a material with a low ionic release in the water, and this allows a high distillation purity of the desalinated water 300. In a preferred but non-limiting embodiment, such material is a metallic material and preferably is stainless steel. The use of a metallic material for realizing the body should not be intended in a limiting manner, as the body, and in particular the lateral wall 2, could be equivalently realized in at least one between a plastic material and a glass material. In a specific and non-limiting embodiment, such a glass material comprises borosilicate glass. The plastic and/or glass material advantageously allow obtaining a reduction of the transmission of heat and cold to the external environment and thus help to optimize the thermal efficiency of the water desalination device 1.

As it is possible to observe in the embodiment shown in FIG. 1, preferably the body of the water desalination device 1 assumes a substantially tubular shape, which preferably, but in a non-limiting extent, has a circular transversal section. The body of the water desalination device 1 develops substantially along a main axis X. Therefore, if such body is tubular in shape, the lateral wall 2 is unique and develops around the axis X, defining a curve without angular points and uninterruptedly. Therefore, in an embodiment, the cavity 2c, 2d also develops along the main axis X. The desalination chamber lies at a first and lower height and the condensation chamber 2c lies at a height higher with respect to the height at which the desalination chamber 2d lies. In a preferred but non-limiting embodiment, the cavity 2c, 2d defines an environment substantially, optionally completely, insulated from the outside.

In the embodiment of FIG. 1 the body is realized in a single piece and thus the lateral wall 2 extends uninterruptedly, in particular along the main axis X. However, this should not be intended in a limiting manner, since the body can be realized in at least two pieces removably connectable each other: these at least two pieces can be configured in a first separate configuration and in a second joined configuration, which is a use or operating configuration, in which the two above-mentioned pieces together realize said lateral wall 2 suitable for defining the cavity comprising the desalination chamber 2d and the condensation chamber 2c.

As schematically shown in FIG. 1, the water desalination device 1 is configured to remove at least part, preferably substantially all, of the salts present within the water to desalinate by means of a desalination by evaporation, in particular comprising the heating of a quantity of water 201 to desalinate and a subsequent condensation of a steam produced by the heating process. This step substantially corresponds to a distillation.

The water desalination device 1 therein described comprises at least a heater 15c, configured to heat the amount of water 201 to desalinate present, in use, within the desalination chamber 2d, and a cooler 15e, configured to determine a condensation of a desalination steam produced by the heating process of the water to desalinate.

Although the water 201 to desalinate can be any kind of water, in a non-limiting embodiment that water to desalinate comprises, or is, seawater.

The water desalination device 1 bases its operating principle on exploiting the thermocline of the seawater to realize a thermal differentiation between the desalination chamber 2d and the condensation chamber 2c. For this reason, the heater 15c comprises a duct within which, in use, seawater flows at a first temperature T1 and the cooler 15e comprises a duct within which, in use, seawater flows at a second temperature T2. In particular, the second temperature T2 is lower with respect to the first temperature T1.

In particular, the Applicant has conceived a water desalination device 1 that uses the temperature variation of water naturally present in the sea to realize the thermal differentiation. Seawater temperature varies according to depth with a law such that, in general, seawater temperature decreases as the depth of analysis increases.

Given a first depth D1 [m], and a second depth D2 [m], wherein D1 is lower than D2, the temperature T1 [° C.] of the seawater at the first depth D1 is higher with respect to the temperature T2 [° C.] of the seawater at the second depth D2.

Figure 2:
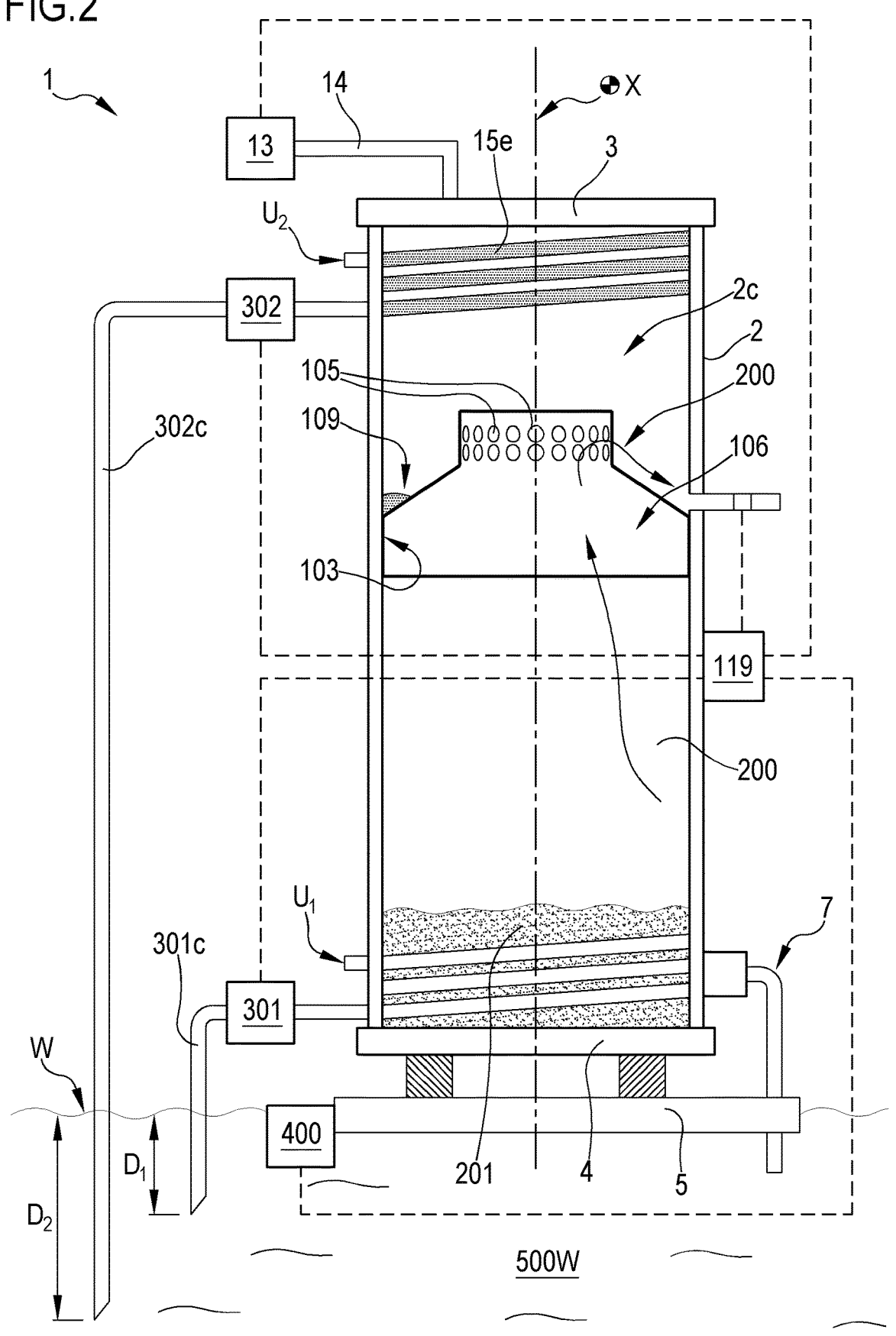
FIG. 2 shows a detailed representation of a particular embodiment of the desalination device object of the present disclosure.

As schematically shown in FIG. 1 and in FIG. 2, the water desalination device 1 comprises at least a first supply device 301 configured to supply seawater at the first prima temperature T1 inside the duct of the heater 15c, and comprises a second supply device 302 configured to supply seawater at the second temperature T2 inside the duct of the cooler 15e.

In a specific, non-limiting embodiment, the first supply device 301 is configured to cause a heat increase of the seawater supplied in the heater 15c. This heat increase can be given simply by compression of the water supplied to the duct of the heater 15c or, alternatively or in combination, via a secondary heater which can comprise, for example and not limited thereto, an electric heater. Thus, the desalination method described therein can advantageously comprise a step of increase of the temperature of the seawater supplied to the duct of the heater, and said increase of the temperature of the seawater supplied to the duct of the heater can be carried out by compression induced by the supply device 301 and/or by means of a secondary heater.

The Applicant observes that the decrease of the temperature of the sea as depth increases does not follow a linear law. There is in particular a predefined depth range, here for convenience defined as the thermocline range D3-D4, wherein the decrease of the temperature as depth increases is more pronounced. The thermocline range is numerically a height. In other words, in such a time range, the first derivative of the temperature curve as a function of depth is lower (higher in absolute value, but with a negative sign) with respect to the first derivative of the temperature curve as a function of depth in different depth ranges with respect to the thermocline range D3-D4. D3 represents the minimum depth of the thermocline range, while D4 represents the maximum depth of the thermocline range. Although the thermocline range is variable according to the specific sea area under consideration, the Applicant observes that the thermocline range D3-D4 is typically contained within the first 200 meters of sea depth, and very often within the first 150 meters of sea depth.

Since it is known that the temperature of the seawater is at its highest in substantial proximity of the surface, in a preferred but non-limiting embodiment, the first depth D1 is typically very low, and preferably, but not limited thereto, is less than 10 m, in particular less than 5 m.

Although in principle the water desalination device 1 described therein can be configured to withdraw seawater at any depth in order to determine a thermal differentiation between the heater 15c and the cooler 15e, preferably but not limited thereto the water desalination device 1 described therein is configured to withdraw water at the depth substantially corresponding to the thermocline range D3-D4 wherein the first derivative of the temperature curve as a function of depth is lower (higher in absolute value, but with a negative sign) with respect to the first derivative of the temperature curve as a function of depth in different depth ranges with respect to the thermocline range D3-D4. Within that thermocline range, the heater 15c is configured to be fed with water withdrawn at the minimum depth D3 of that range and the cooler 15e is configured to be supplied with water withdrawn at the maximum depth D4 of that range. This allows to optimize the efficiency of the water desalination device, since in the thermocline range D3-D4 the maximum efficiency in relation to the hydraulic head necessary for the withdrawal of water is reached, especially when the water desalination device 1 is configured to float on the sea surface W.

The Applicant in particular observes that the prevalence necessary for bringing seawater to the duct of the heater 15c and of the cooler 15e can be reduced by positioning the body under water, even at a height lower than the first depth D1. A specific operating configuration can therefore comprise the positioning of the body at a depth comprised between the first depth D1 and the second depth D2.

In order to make the water desalination device 1 therein described sufficiently efficient, and to prevent the presence of a high temperature within the desalination chamber, the water desalination device 1 is configured to maintain a pressure lower with respect to the atmospheric pressure within said cavity (2c, 2d, in particular within said desalination chamber 2d and within said condensation chamber 2c. For this purpose it comprises a vacuum pump 13 connected to said cavity and configured to create, in use, a predetermined vacuum within the cavity. The use of the vacuum within the cavity (2c, 2d advantageously allows to reduce the maximum temperature to which it is necessary to bring the heater 15c in order to determine the boiling of the water 201 to desalinate within the desalination chamber 2d.

In particular the first and the second supply device 301, 302 comprise respectively a pump, in particular—but not limited thereto—an electric type pump.

In a particular embodiment, the supply device 301 is configured to withdraw seawater at a first depth D1, such that the seawater has said first temperature T1 and wherein the second supply device 302 is configured to withdraw seawater at a second depth D2, greater than the first depth D1 in such a way that the seawater has said second temperature T2.

It is observed that the water 201 to desalinate through the water desalination device 1 therein described can advantageously be seawater or another type of water. For this reason, in a particular and non-limiting embodiment, the water desalination device 1 is configured to withdraw seawater and introduce or allow the introduction of such seawater within the cavity 2c, 2d for the purposes of desalination. Although the seawater can be withdrawn at any depth, in a preferred but non-limiting embodiment such seawater is withdrawn at the lowest possible depth. This allows from the very beginning to introduce seawater within the cavity 2c, 2d at the highest possible temperature in order to reduce the quantity of heat which must be supplied to the quantity of water 201 within the cavity in order to cause the evaporation thereof.

FIG. 1 shows a non-limiting embodiment wherein the water desalination device 1 is attached to the sea floor 500f through a retaining element 700. Through that retaining element the water desalination device 1 is configured to lie at a determined height with respect to sea floor 500f. In a non-limiting but preferred embodiment the retaining element 700 is a rope or a chain. However, this type of retaining element should not be intended in a limiting manner, as it is possible to have substantially rigid retaining elements such as pylons of concrete and/or metallic material.

A ballast 600 can be optionally present in substantial correspondence of the sea floor 500f in order to give sufficient anchoring and prevent the unintentional displacement of the water desalination device 1 even in case of strong sea currents and/or storms.

Alternatively, in an embodiment not shown, the water desalination device 1 can be configured to float on the water W and thus to lie at a variable height with respect to sea floor 500f. In that case the water desalination device 1 will comprise appropriate flotation elements.

In a non-limiting but preferred embodiment, the water desalination device 1 comprises also an energy recovery device 400 configured to generate electric power from the wave motion and/or by height difference assumed with respect to a sea floor 500f. This energy recovery device 400 is operatively connected to, and supplies power to, at least one between the first supply device 301 and the second supply device 302. Thanks to this aspect, the power consumption of the device therein described is therefore reduced.

Alternatively, one between the body of the water desalination device 1 or the energy recovery device 400 is configured to be anchored to a sea floor 500f in such a way to lie at a predetermined height with respect to said sea floor 500f and the other one between the energy recovery device 400 or the body of the water desalination device 1 is configured to lie at a height variable with respect to said sea floor 500f and optionally is configured to float on the water so that to assume a height variable with respect to the sea floor 500f and wherein the energy recovery device 400 is configured to generate electric power from the wave motion and/or by height difference with respect to the sea floor 500f by relative movement with respect to said body.

More precisely, when the water desalination device 1 is configured to lie at a predetermined height with respect to sea floor 500f, the energy recovery device will be the one to move with respect to body of the water desalination device 1 in such a way that electric power can be produced. Otherwise, when the water desalination device 1 is configured to lie at a variable height with respect to the sea floor 500f, in particular resulting in floating on the water surface W, the energy recovery device 400 will be the one to be anchored to the sea floor 500f so as to lie at a determined and fixed height with respect to the latter, and the body of the water desalination device will move in relation to the energy recovery device.

A connecting element, for example a movable arm 400a, connects the energy recovery device 400 with the body of the water desalination device 1.

In a preferred but non-limiting embodiment, the water desalination device 1 also comprises a solar panel 400x that is configured to be operatively coupled with the energy recovery device 400 in order to produce electric power. Thanks to the use of the solar panel 400x it is possible to increase the efficiency of the water desalination device therein described. The Applicant observes that the solar panel 400x can be installed as an alternative to the energy recovery device 400.

The cavity of the body of the water desalination device 1 can be realized in a variety of ways, and can in principle assume a variety of shapes as long as on the whole the desalination chamber 2d and the condensation chamber 2c can be realized or defined.

Figure 3:
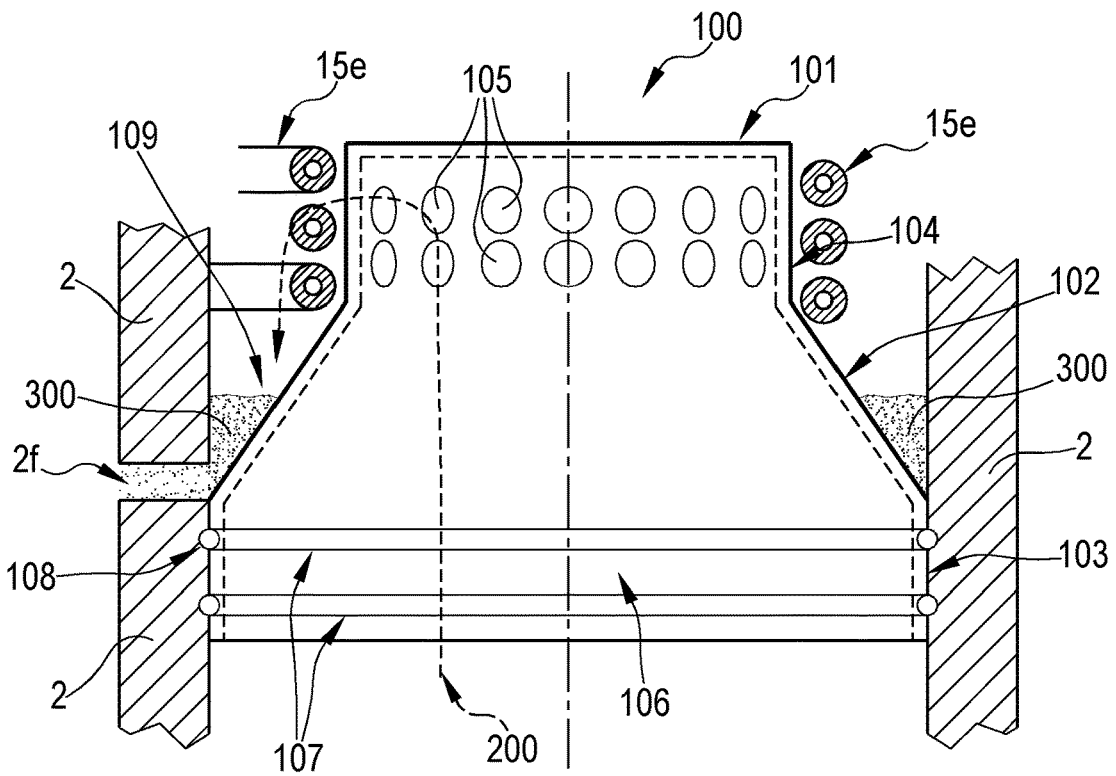
FIG. 3 shows a first embodiment of a particular element, in particular of an intermediate or separating element, forming part of the water desalination device.
Figure 4:
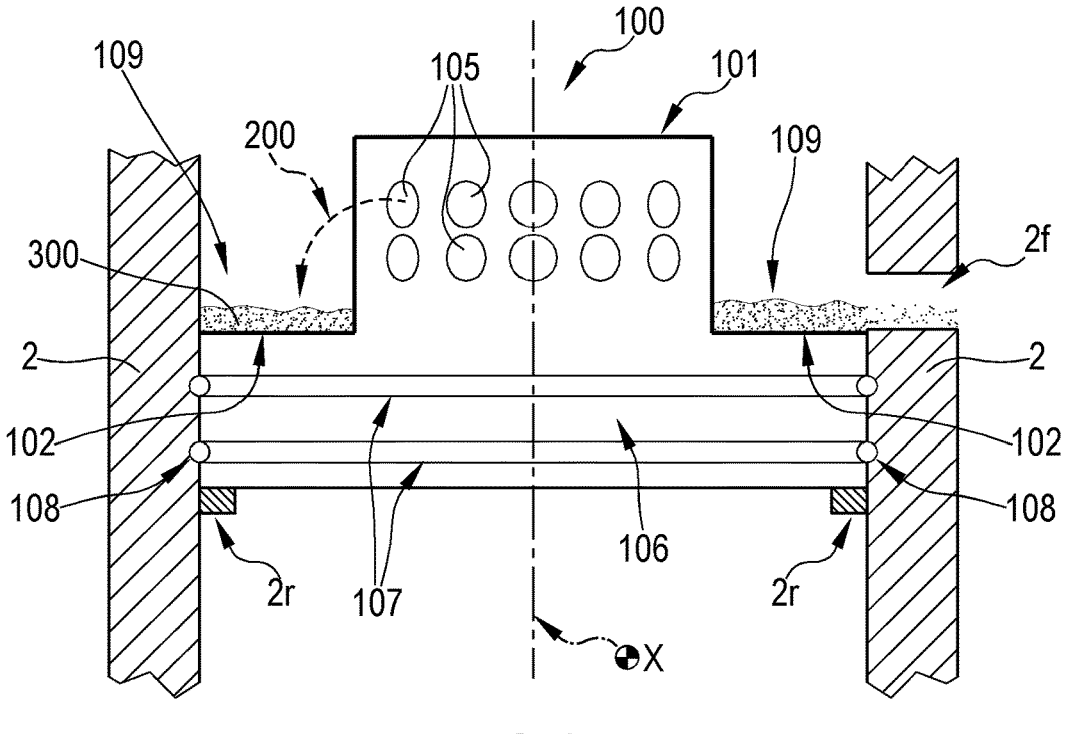
FIG. 4 shows a second embodiment of a particular element, in particular of an intermediate or separating element, forming part of the water desalination device.

As schematically shown in the FIGS. 2, 3 and 4, the water desalination device 1 can comprise an intermediate or separating element 100, positioned in an intermediate position of the cavity 2c, 2d of the body, at least a portion of junction 103 with the lateral wall 2. The intermediate or separating element 100 is configured to divide the cavity 2c, 2d realizing the desalination chamber 2d and the condensation chamber 2c.

The intermediate or separating element 100 comprises at least a through hole 105 configured to allow the passage of at least a steam deriving from the heating of the water 201 to desalinate from the desalination chamber 2d to the condensation chamber 2c.

The Applicant observes that in a preferred but non-limiting embodiment, the intermediate or separating element 100 is realized in plastic material, at least partially and preferably substantially integrally. Since in use there is a significant temperature difference between the temperature in or of the desalination chamber 2d with respect to the condensation chamber 2c, the use of a plastic material 13 in particular with low thermal conductivity, facilitates the maintenance of this thermal differential.

In an embodiment, the water desalination device 1 object of the present disclosure comprises an inlet duct 7 for the water to desalinate, and an outlet duct 9 for the desalinated water. The through hole 2f, which is an outlet hole, is connected with the outlet duct 9. It is observed in detail that the outlet duct 9 is configured to be connected with a further duct that transports the desalinated water 300 on land to a specific destination, schematically represented in FIG. 1 as a building.

The intermediate or separating element 100 comprises at least a collection portion 109 of desalinated water 300. Although various embodiments of the intermediate or separating element 100 can be used, some preferred embodiments of the intermediate or separating element are described hereinafter in detail.

The intermediate or separating element 100 positioned in an intermediate position of the cavity 2c, 2d. The intermediate or separating element has at least one portion of junction 103 in contact with the lateral wall 2 and is configured to divide the cavity 2c, 2d defined in the lateral wall 2 by realizing a desalination chamber and a condensation chamber.

In particular, this portion of junction comprises, or is, a lateral seal wall 103, in contact with the lateral wall 2 of the body and is configured to divide the cavity 2c, 2d in the desalination chamber 2d and, above, in the condensation chamber 2c.

In particular, the intermediate or separating element 100 comprises at least a through hole 105, which is configured to allow the passage of at least a steam deriving from the heating of the water 201 to desalinate from the desalination chamber to the condensation chamber.

Preferably, but in a non-limiting extent, the intermediate or separating element 100 comprises a plurality of through holes 105. This allows a greater uniformity of passage of the steam deriving from the heating of the water 201 to desalinate from the desalination chamber 2d to the condensation chamber 2c, also since in this way the plurality of through holes 105 can have a smaller diameter with respect to the diameter assumed by the single through hole 105.

Therefore, the condensation chamber 2c and the desalination chamber 2d communicate through the through hole 105, or where present, through the plurality of through holes 105.

In a preferred but non-limiting embodiment, this through hole 105 or, where present, the plurality of through holes 105, has a substantially circular transversal section.

In an embodiment, the intermediate or separating element 100 further comprises at least a lateral wall of collection 102, in particular a lateral wall of collection, joint and/or bordering the seal wall 103.

The bottom portion of the intermediate or separating element 100 is clearly open, and therefore the intermediate or separating element 100 realizes a substantially domed cavity 106, which allows collecting as a kind of chimney the steam deriving from the heating of the water 201 to desalinate and convey it towards the plurality of through holes 105. When the steam deriving from the heating of the water 201 to desalinate has passed through the plurality of through holes 105, said desalination steam substantially passes from the desalination chamber 2d to the condensation chamber 2c, and in this chamber tends to condense again towards a liquid phase. The arrow 200 indicates the path—at least partially aligned along the main axis X—of the steam deriving from the heating of the water 201 to desalinate from the desalination chamber 2d to the condensation chamber 2c.

A collection portion of desalinated water 300, identified by the reference number 109, is comprised between the lateral wall 2 and the lateral wall of collection. This means that the lateral wall of collection 102 is configured to define, at least partially, a collection portion 109 of desalinated water 300.

In particular, the present disclosure thus shows a step of heating of the water 201 to desalinate wherein the boiling causes a flow of the deriving from the heating of the water 201 to desalinate towards an intermediate or separating element 100 positioned in an intermediate position of the cavity 2c, 2d of the body of the water desalination device 1 in such a way that a portion of junction 103 of the intermediate or separating element 100, in particular the seal wall, is in contact with the lateral wall 2 and determines a division of said cavity 2c, 2d realizing the desalination chamber 2d and the condensation chamber 2c.

A first preferred and non-limiting embodiment of the intermediate or separating element 100 is represented in FIG. 3. In this case, it is observed that the intermediate or separating element 100 is configured to be introduced axially along the main axis X within the cavity 2c, 2d defined by the lateral wall 2.

The portion of junction, in particular in this case in a form of seal wall 103, extends substantially parallel to the main axis X and if observed along a section orthogonal to the main axis X identifies a circumference in substantial perfect adherence with the inner face of the lateral wall 2. In order to increase the tightness of the intermediate or separating element 100 on the lateral wall, this intermediate or separating element can comprise at least a seal ring 108, positioned in substantial correspondence of the seal wall 103. The seal ring 108 is realized in a flexible material, and is configured to withstand the temperatures of water desalination.

The embodiment shown in FIG. 3 shows the presence of a first and a second seal ring 108 positioned in substantial correspondence of the seal wall 103. On the seal wall 103 at least a recess 107 can be realized, of substantially annular shape and preferably aligned along a substantially orthogonal plane with respect to the main axis X. Within this recess 107 is housed, at least in part, said seal ring 108. The specific embodiment shown in FIG. 3 has two annular-type recesses 107 aligned on parallel planes.

In an embodiment, that is represented in detail in FIG. 2 and in FIG. 3, the lateral wall of collection 102 is substantially inclined with respect to the seal wall 103, and this means that this lateral wall of collection 102 is substantially inclined with respect to the main axis X. This inclination can be for example, but not limited thereto, comprised between 20° and 70°, more preferably between 30° and 60°. The inclination between the lateral wall of collection 102 and the seal wall 103 and the main axis X is non-orthogonal.

An ideal line of junction joins the lateral wall of collection 102 with the seal wall 103. This ideal line of junction is positioned in a lower portion of the lateral wall of collection 102 and in an upper portion of the seal wall 103. This means that the lateral wall of collection 102 is at a higher height with respect to the height at which the seal wall 103 lies.

The desalination carried out through the water desalination device 1 therein described comprises therefore a collection of the condensate of the desalination steam, said collection taking place by means of a lateral wall of collection 102 of the intermediate or separating element 100, which is joint and/or bordering the portion of junction 103, in a collection portion 109 comprised between the lateral wall 2 and the lateral wall of collection 102 and/or arranged in a radially central position of the intermediate or separating element 100.

The intermediate or separating element 100 comprises a head portion 101 and the plurality of through holes 105 (or the single through hole, if present in this form) is positioned in substantial correspondence of said head portion 101. The plurality of through holes 105 is realized in substantial correspondence of the head portion 101.

Preferably, but not limited thereto, the plurality of through holes 105 is arranged along the lateral wall 104 of the head portion 101, and on that wall is evenly distributed. In particular the plurality of through holes 105 extends uninterruptedly over all 360° of the zenith plane on which the lateral wall 104 faces. In particular, in the embodiments shown in the attached figures, each hole of the plurality of through holes 105 has an axis substantially orthogonal to the main axis X. In this way, the intermediate or separating element 100 is configured to determine, through at least part of the plurality of through-holes 105, a vaporization and condensation path 200 substantially curved and at least partially misaligned with respect to said main axis X. This misalignment advantageously prevents the condensation steam from flowing along a substantially extremely direct and linear path 200 along substantially only the axis X, which would lead to its falling back to the desalination chamber 2d, reducing the desalination efficiency obtained therein.

This path comprises at least a partial falling of the steam deriving from the heating of the water 201 to desalinate downwards, since the collection portion 109 of desalinated water 300 lies at a lower height with respect to said head portion 101.

In the embodiment of FIG. 2, the head portion 101 comprises an upper wall substantially orthogonal with respect to the main axis X and, preferably of a discoidal shape. The head portion 101 further comprises a lateral wall 104, which is conjoined with the upper wall in substantial correspondence of a portion of its upper end. The lateral wall 104 of the head portion 101 is preferably aligned to the main axis X, thus extending along a direction parallel to the direction along which the seal wall 103 extends. This particular inclination (parallel) with respect to the main axis X shall not be intended in a limiting manner, as it is possible to realize a lateral wall with a different (non-zero) inclination with respect to the main axis X.

The at least a through hole, in particular each through hole of the plurality of through holes 105 has an axis that is substantially inclined with respect to the main axis X, and in particular, in the embodiments represented in the attached figures, the axis of each of said holes is substantially orthogonal with respect to the main axis X. This allows to optimize the desalination process and allows to avoid a substantially direct and/or axial path of vaporization and condensation of the steam deriving from the heating of the water to desalinate, which would lead to the risk of a condensation that by gravity could also occur within the desalination chamber, in particular in view of the substantially axial structure of the cavity 2c, 2d.

This means that in an embodiment the upper wall of the head portion 101 has no holes. Although not shown, the Applicant has realized another embodiment of the intermediate or separating element 100 wherein the upper wall of the head portion 101 has part of the plurality of through holes 105. Another embodiment of the intermediate or separating element 100 has through holes only in substantial correspondence of the upper wall of the head portion 101.

In the embodiment of FIG. 2 the collection portion 109 of the desalinated water 300 is of substantially annular shape and has a pointed bottom zone with a transversal section smaller with respect to the transversal section of the upper zone of the collection portion 109. In other words, observing the intermediate or separating element 100 along a section parallel to the main axis X it is observed a substantially triangular shape for the collection portion 109.

The Applicant observes that this particular configuration with the lateral wall of collection 102 inclined with respect to the main axis X advantageously allows to optimize the collection of the desalinated water 300 in an increasingly smaller portion of the collection portion 109 and in substantial contact with the lateral wall 2. This allows reducing the risk of stagnation of the desalinated water 300 and allows a higher efficiency of collection for the desalinated water itself.

An alternative embodiment of the intermediate or separating element 100 is shown in FIG. 3. Also in this case, it is observed that the intermediate or separating element 100 is configured to be introduced axially along the main axis X within the cavity 2c, 2d defined by the lateral wall 2.

Also in the embodiment of FIG. 4, the intermediate or separating element 100 comprises a portion of junction with the lateral wall 2 and is configured to divide the cavity 2c, 2d realizing said desalination chamber 2d and the condensation chamber 2c. In particular, the portion of junction comprises, or is, a seal wall 103.

The portion of junction, in particular the seal wall 103, extends substantially parallel to the main axis X and if observed along a section orthogonal to the main axis X identifies a circumference in substantial perfect adherence with the inner face of the lateral wall 2. In order to increase the tightness of the intermediate or separating element 100 on the lateral wall, this intermediate or separating element can comprise at least a seal ring 108, positioned in substantial correspondence of the seal wall 103. The embodiment shown in FIG. 3 shows the presence of a first and a second seal ring 108 positioned in substantial correspondence of the seal wall 103. On the seal wall 103 it can be realized a recess 107, with a substantially annular shape and preferably aligned along a plane substantially orthogonal with respect to the main axis X. Within this recess 107 is housed, at least partially, said seal ring 108. The specific embodiment shown in FIG. 4 has two recesses 107 of annular type aligned on parallel planes.

The lateral wall of collection 102 is substantially inclined with respect to the seal wall 103, and this means that such lateral wall of collection 102 is substantially inclined with respect to the main axis X.

In particular, the lateral wall of collection 102 is orthogonal with respect to the seal wall 103 and with respect to the main axis X.

An ideal line of junction joins the lateral wall of collection 102 with the seal wall 103. This ideal line of junction is positioned in a lower portion of the lateral wall of collection 102 and in an upper portion of the seal wall 103. This means that the lateral wall of collection 102 lies at a height higher with respect to the height at which the seal wall 103 lies.

The intermediate or separating element 100 comprises a head portion 101 and the at least a through hole 105, in particular the plurality of through holes 105, is positioned in substantial correspondence of the head portion 101. The collection portion 109 of desalinated water 300 lies at a lower height with respect to the said head portion 101.

In the embodiment of FIG. 4, the head portion 101 comprises an upper wall substantially orthogonal with respect to the main axis X and, preferably of discoidal shape. The head portion 101 further comprises a lateral wall 104, which is conjoined with the upper wall in substantial correspondence of a portion of its upper end. The lateral wall 104 of the head portion 101 is preferably aligned to the main axis X, thus extending along a direction parallel to the direction along which the seal wall 103 extends. This particular inclination (parallel) with respect to the main axis X should not be intended in a limiting manner, as it is possible to realize a lateral wall with a different (non-zero) inclination with respect to the main axis X.

The at least one through hole, in particular the plurality of through holes 105 is realized in substantial correspondence of the head portion 101. Preferably, but not limited thereto, the plurality of through holes 105 is arranged along the lateral wall 104 of the head portion 101. This means that in an embodiment the upper wall of the head portion 101 has no holes. Although not shown, the Applicant has realized another embodiment of the intermediate or separating element 100 wherein the upper wall of the head portion 101 has part of the plurality of through holes 105. Another embodiment of the intermediate or separating element 100 has through holes only in substantial correspondence of the upper wall of the head portion 101.

In the embodiment of FIG. 4 the collection portion 109 of the desalinated water 300 is of substantially annular shape and has a flat bottom zone; this means that the bottom zone of the collection portion 109 develops along a plane substantially orthogonal to the main axis X.

The Applicant observes that in the embodiment of FIG. 4 is highlighted a striker ring 2r protruding from the inner face of the lateral wall. When the transversal section of the cavity 2c, 2d is circular, the striker ring 2r detects a circumference with a smaller diameter with respect to the diameter of the circumference detected by the lateral wall.

The striker ring 2r is configured and specifically designed to allow the support of a lower portion of the intermediate or separating element 100; the latter in particular rests on the striker ring 2r in substantial correspondence of a lower edge of the seal wall 103. The striker ring 2r can develop along the entire circumference of the lateral wall uninterruptedly or, alternatively, be defined on at least two or more sectors at ranges with recesses in correspondence of which the transversal section detects the same diameter assumed by the lateral wall.

In a preferred but non-limiting embodiment, the striker ring 2r is integral and/or is realized in a single piece with the lateral wall.

The Applicant observes that the two embodiments of the intermediate or separating element 100 shown in FIG. 3 and FIG. 4 shall not be considered as limiting, as it is also possible to realize the intermediate or separating element at least in another embodiment briefly described below.

In contrast to the embodiment of FIG. 3 or 4, wherein the lateral wall of collection 102 is inclined outwards defining a collection portion 109 substantially of annular type, the further embodiment of the intermediate or separating element described therein comprises a collection portion 109 which is positioned in a radially central zone of the intermediate or separating element 100. In this embodiment, in particular, the lateral wall of collection 102 is inclined inwards so as to convey the condensate of the steam deriving from the heating of the water to desalinate ideally in correspondence of a central zone of the collection portion, in particular in a central zone of the collection portion which is axially aligned to the main axis X.

The lateral wall of collection 102 defines, when observed in section along a plane that, as in the case of FIG. 3 and FIG. 4, comprises the main axis X, a substantially V-shape, or funnel-shape, centered along the longitudinal axis X. In order to allow an evacuation of the desalinated water 300 from the collection portion 109, an auxiliary duct connects the through hole 2f present on the lateral wall of the body, and opens in the collection portion 109, in particular in the bottom portion (vertex of the "V") of the collection portion.

The intermediate or separating element 100 is removable from the cavity 2c, 2d. Thanks to this aspect, particularly when at least the head portion or bottom portion of the body can be opened as previously described, it favours the possibility of easily cleaning inside of the cavity 2c, 2d.

A particular embodiment of the intermediate or separating element 100 comprises comprises a filtering membrane. This membrane is configured to allow the passage of water steam and is also configured to retain solid residuals typical of the water desalination process and prevent the passage of significant quantities of water in liquid shape, in particular in droplets or bubbles.

This filtering membrane acts substantially as a molecular sieve, being provided with holes or passages or pores substantially always open, capable to determine and allow a passage of molecules smaller than a predetermined size and, likewise, to determine an impediment to the passage of molecules of a size greater than or equal to said predetermined size. In particular, the above-mentioned drops or bubbles are significantly larger than the predetermined size.

Preferably, such filtering membrane is positioned within the cavity 106 of the intermediate or separating element 100. In other words, it can be considered that the filtering membrane is still positioned within the desalination chamber. The Applicant observes, in particular, that the filtering membrane can optionally be installed in the specific embodiments of the intermediate or separating element 100 described in the previous portion of the description and also shown in the FIGS. 3 and 4.

Optionally, this filtering membrane is removably connected to the body of the intermediate or separating element, and can be for example installed on a support ring removably connected to the body of the intermediate or separating element 100. This allows a rapid replacement thereof in case of need.

Various types of material can be used to realize the filtering membrane. Preferably, however, this filtering membrane is realized in a non-hygroscopic material. In a non-limiting embodiment, this filtering membrane is a polymer membrane, in particular perfluorocarbon (PFC), more in particular polytetrafluoroethylene (PTFE), even more in particular Gore-Tex®.

In use, the water desalination 201 in the desalination chamber causes a production of bubbles, which can be pushed upwards by coming into substantial contact with the intermediate or separating element 100. Part of the water bubbles and/or distillation solid residuals could pass through the through holes 105, unduly coming into substantial correspondence of the collection portion 109. Therefore, the filtration process concomitant to the desalination of the water 201, brought about by the filtering membrane, allows to optimize the desalination process, leading to a lower contamination of the desalinated water 300, which is reflected in a lower electrical conductivity of the latter.

In use, then, a water desalination process comprises causing a boiling of the water 201 to desalinate contained within the desalination chamber 2*d* by the effect of the heat transmitted herein by the heater 15*c*, and also comprises the passage of the steam deriving from the heating of the water 201 to desalinate from the desalination chamber 2*d* to the condensation chamber 2*c* through the passage by the intermediate or separating element 100 and, where present, through the filtering membrane.

Still optionally, the cavity 106 of the intermediate or separating element 100 comprises a labyrinth of distribution of the desalination steam that communicates with the through holes 105.

Referring back to the description of the lateral wall, it is observed that this lateral wall 2 comprises a through hole identified by the numerical reference 2*f*. This through hole 2*f* is configured to allow an outflow of the desalinated water 300 from the collection portion 109 and therefore constitutes an outlet for the desalinated water 300.

The through hole 2*f*, identified hereinafter as the outlet hole, is positioned at a particular height substantially corresponding with the bottom area of the collection portion 109 and/or with the top edge of the portion of junction, and in particular of the seal wall 103. Thanks to this aspect, it is advantageously possible to realize an optimal extraction of the desalinated water 300 from the collection portion 109, without wastes.

A particular embodiment of the water desalination device 1 therein described further comprises an auxiliary heater 500, which is configured to inject thermal energy in such a way that the water 201 to desalinate is heated faster and/or at a higher temperature. In an embodiment, that auxiliary heater 500 comprises an electrical resistance. Such auxiliary heater 500 can be conveniently positioned in substantial correspondence of the desalination chamber, and in detail can be placed at a height substantially equal to the height in correspondence of which lies the heater 15*c*.

Should this heater 15*c* assume a spiral or coil shape, the auxiliary heater 500 can be located within said spiral or coil, in particular delineating an inner circumference of circumscription having a diameter smaller than or equal to that of the spiral or coil, or assume itself a spiral and/or coil shape and have portions interposed, in particular substantially positioned, in correspondence with vertically portions of space present between one turn and the next turn of the spiral or coil, so as to be substantially vertically aligned therewith. In an embodiment, therefore, observing the assembly of the heater 15*c* and of the auxiliary heater 500 from above, a substantial vertical alignment would be observed, and the space within the spiral or coil identified by the heater 15*c* would not be compromised or otherwise limited by the presence of the auxiliary heater 500.

The Applicant observes that the water desalination device 1 therein described can operate in substantially continuous or discontinuous cycle.

In the continuous cycle, the water desalination device 1 is configured to supply water 201 to desalinate in the desalination chamber substantially uninterruptedly. In the continuous cycle, therefore, also the water desalination takes place in substantial continuity, and, preferably, also the extraction of the water from the collection portion, through the through hole 2*f*, or outlet hole, and the outlet duct 9 of the desalinated water takes place substantially uninterruptedly.

In the discontinuous cycle, the water desalination device 1 instead operates as follows.

In a first step the water 201 to desalinate is supplied in the desalination chamber, for example through an opening of the inlet valve 8 for a predetermined period of time. The supply of the water 201 to desalinate in the desalination chamber is then interrupted. A second and subsequent step provides for the heating of the water 201 to desalinate in the desalination chamber through the heater 15*c*.

Upon completion of the water desalination 201 in the desalination chamber, an extraction, in particular a complete extraction, of the water contained in the collection portion 109 is carried out.

The cycle can then resume with a new (first) step of supplying water in the desalination chamber.

According to the embodiments, the water desalination device 1 can therefore comprise at least one between:
- an operating configuration of distribution of desalinated water 300, in which the desalinated water collected in the collection portion 109 is made to flow into an outlet duct 10,
- an operating configuration of loading of water 201 to desalinate, in which the water to desalinate is supplied through an inlet duct into the desalination chamber, and
- an operating configuration of desalination of water, in which the water 201 to desalinate is heated in the desalination chamber as above described.

When the water desalination device 1 operates in continuous cycle, in the operating configuration of distribution of desalinated water 300, such device is configured to maintain within said cavity 2*c*, 2*d* a predetermined vacuum level with respect to a predetermined threshold in the continuation of the operating configuration of distribution of desalinated water 300. This means that the absolute pressure within the cavity 2*c*, 2*d* shall not exceed this determined threshold.

Furthermore, when the water desalination device 1 operates in continuous cycle of desalination, the operating configuration of distribution of the desalinated water 300 and operating configuration of loading of water 201 to desalinate take place substantially uninterruptedly and substantial time simultaneity with the water desalination.

Preferably, also in the operating configuration of loading of water 201 the water desalination device 1 is configured to maintain within said cavity (2*c*, 2*d* a predetermined level of vacuum with respect to a predetermined threshold in the continuation of the operating configuration of loading water 201.

The Applicant finally observes that the heater 15*c* and the cooler 15*e* comprise each one an outlet U1, U2 destined to discharge the seawater which in use is supplied therein. In an embodiment the outlet U1, U2 of the heater and of the cooler 15*c*, 15*e* is free, and is therefore configured to discharge back into the sea 500*w* the water outflowing respectively from the heater 15*c* or from the cooler 15*e*. In a non-limiting and alternative embodiment with respect to the preceding, the outlet U1, U2 is configured to allow to collect the water outflowing from the heater 15*c* and/or the cooler 15*e* in a separate collection container, for example to carry out a particular treatment on such water.

The Applicant has conceived another embodiment of the water desalination device 1. In that embodiment the water desalination device 1 comprises a body a body having a lateral wall 2 which defines at least a cavity (2*c*, 2*d* suitable for allowing the desalination of an quantity of water 201 to desalinate. In the cavity 2*c*, 2*d* are defined a desalination chamber 2*d* and a condensation chamber 2*c*. Such water desalination device 1 comprises at least a heater 15*c* configured to heat the quantity of water to desalinate. For convenience of graphic representation, the heater 15*c* is omitted from the section of FIG. 12.

The body of the water desalination device 1 is divided between at least an upper first portion integrating the head portion 3 and a lower portion integrating the base portion 4. In an embodiment, such first upper portion and such second lower portion are removably connectable to each other in a direct manner.

In this specific embodiment, the body of the water desalination device 1 comprises: a first upper portion integrating the head portion 3, a lower portion integrating the base portion 4 and an intermediate portion, positioned between the first upper portion and the second lower portion. In use, the tightness of the cavity 2c, 2d is ensured by the presence of seals respectively positioned between the first upper portion and the intermediate portion and between the second lower portion and the intermediate portion. Thus, the first upper portion, the second lower portion and the intermediate portion are removably connectable to each other.

In this embodiment, the intermediate or separating element 100 is always positioned in an intermediate position of the cavity 2c, 2d of the body globally defined through the first upper portion, the second lower portion and the intermediate portion, and has a portion of junction 103 with the lateral wall 2, which in this case represents the lateral wall of the first upper portion, the second lower portion and the intermediate portion. The intermediate or separating element 100 is configured to and specifically intended to divide the cavity 2c, 2d realizing the desalination chamber 2d and the condensation chamber 2c.

The intermediate or separating element 100 comprises at least a through hole 105 configured to allow the passage of at least a steam deriving from the heating of the water 201 to desalinate from the desalination chamber to the condensation chamber and comprises at least a collection portion 109 of desalinated water 300.

In this embodiment, the intermediate or separating element 100 is integral with the intermediate portion of the body of the water desalination device 1. This should not be intended in a limiting way, since in an alternative embodiment, the intermediate or separating element 100 could be integral with the first upper portion or the second lower portion of the body. In particular, the intermediate or separating element 100 is such that the portion of junction 103 is an extension of the lateral wall 2 of the intermediate portion, in particular an uninterrupted extension of that lateral wall 2 of the intermediate portion.

In the embodiment therein described the through hole 105 above mentioned is a central through hole axially opening on the main axis X, and is configured to allow the passage of the steam deriving from the heating of the water 201 to desalinate from bottom upwards in a direction substantially axial with the main axis X. The through hole 105 opens directly on the cavity 106 defined by the intermediate or separating element.

However, in order to prevent a risk of direct fallout of the steam deriving from the heating of the water 201 to desalinate from the condensation chamber 2c to the desalination chamber 2d, the Applicant has conceived an intermediate septum, which is introduced and lies in use in the cavity of the intermediate or separating element 100 at a lower height with respect to the height at which the through hole 105 is present. Such intermediate septum is configured to force the steam deriving from the heating of the water 201 to desalinate into a curved path at least partially misaligned with respect to the main axis X between the desalination chamber 2d and the condensation chamber 2c. The intermediate septum is therefore configured to prevent a substantially axial path (in particular, along the main axis X) of the steam deriving from the heating of the water 201 to desalinate between the desalination chamber 2d and the condensation chamber 2c.

In a non-limiting embodiment, the intermediate septum is made in plastic material. This should not be intended in a limiting way, as the intermediate septum can also be realized in metallic or glassy material, for example and not limited thereto borosilicate glass.

In a preferred but non-limiting embodiment, the intermediate septum is fixed on the lateral wall 2 of the intermediate portion of the body in correspondence of a recess 2b annularly realized on the inner face of the lateral wall 2.

The intermediate septum presents a plurality of division planes superimposed on each other, each of which defines (or comprises) at least one passage opening for the steam deriving from the heating of the water 201 to desalinate. The passage openings identified by two contiguous division planes are misaligned with each other in such a way to cause such curved path 200 for the steam deriving from the heating of the water 201 to desalinate. Preferably, but not limited thereto, the division planes are parallel to each other and are substantially orthogonal to the main axis X. This specific configuration is not to be intended as limiting.

The Applicant underlines that the expression "identifies (or comprises)" is used because a specific embodiment of the division plane could comprise a seal ring on the lateral wall defining the cavity 106, wherein said seal ring is partially occluded by the wall of the division plane, and for this reason strictly speaking the opening would actually be comprised within the division plane itself.

In an embodiment, the cavity 106 of the intermediate or separating element 100 presents a transversal section of circular shape that progressively tapers along the main axis X between the lower portion of the intermediate or separating element 100 towards the upper portion of the intermediate or separating element 100. With such shape of the transversal section, conveniently the division planes also have a partially circular perimeter profile, which in particular defines an incomplete circumferential sector. The perimeter profile of each of the division planes is such that it causes a contact between the division plane and the inner face of the lateral wall of the cavity 106. In the specific embodiment therein described, the lateral wall of the cavity 106 corresponds substantially to the collection wall 102.

The division planes can be joined integrally by realizing a single piece, or can be divided and held in a reciprocal joint configuration by means of a fastener. Such fastener is preferably a screw, and is positioned in correspondence of a hole in each of the division planes. Such a hole is centered on the axis X.

Since the specific embodiment therein described has the intermediate or separating element 100 in substantial correspondence of the intermediate portion of the body, in such a case the through hole 2f will be realized on the lateral wall 2 in substantial correspondence of the intermediate portion. Clearly, this configuration is not to be considered as limiting, since if the intermediate or separating element 100 is realized in substantial correspondence of the first upper portion or of the second lower portion of the body, such through hole 2f will be realized in the corresponding portion.

Finally, it is clear that additions, modifications or variants, which are obvious to a person skilled in the art, can be applied to the object of the present disclosure without departing from the scope provided by the attached claims.

The invention claimed is:

1. A water desalination device, comprising:

a body having a lateral wall and defining a cavity suitable for allowing the desalination of an amount of water to desalinate, wherein in said cavity are defined a desalination chamber and a condensation chamber, wherein the condensation chamber comprises a collection portion destined to collect at least temporarily desalinated water, at least a heater, configured to heat the amount of water to desalinate in the desalination chamber, in order to produce a steam, a cooler, for condensation of a steam deriving from the heating of the water to desalinate, wherein the heater comprises a duct within which, in use, flows seawater at a first temperature, the cooler comprises a duct within which, in use, flows seawater at a second temperature lower with respect to said first temperature, wherein said water desalination device is configured to maintain a pressure lower with respect to the atmospheric one within said desalination chamber and within said condensation chamber, and is connected to, a vacuum pump acting on said cavity to create a predetermined vacuum within said cavity, said water desalination device comprising at least a first supply device configured to supply seawater at said first temperature into the duct of the heater, and comprising a second supply device configured to supply seawater at said second temperature into the duct of the cooler; said desalination device being configured to exploit the thermocline of the seawater; said first depth and said second depth being substantially comprised in the range of thermocline of the seawater;

the device comprising an energy recovery device configured to generate electric power from the wave motion and/or due to height difference with respect to a sea floor;

the energy recovery device being operatively connected with, and supplying electric power to the first supply device.

2. The device according to claim 1, wherein the first supply device is configured to withdraw seawater at a first depth at which said seawater has said first temperature and wherein the second supply device is configured to withdraw seawater at second depth, greater than the first depth, at which said seawater has said second temperature.

3. The device according to claim 2, wherein the first supply device comprises a pump, and/or wherein the second supply element comprises a pump.

4. The device according to claim 1, configured to desalinate water through heating up to evaporation and/or wherein said desalination is a desalination by evaporation.

5. The device according to claim 2, wherein said first depth and said second depth are substantially comprised in a thermocline range of the seawater.

6. The device according to claim 1, wherein the energy recovery device is operatively connected with, and supplies electric power to, the second supply device.

7. The device according to claim 1, wherein one between the body or the energy recovery device is configured to be anchored to a sea floor in such a way to lie at a predetermined height with respect to said sea floor and wherein the other one between said energy recovery device or the body is configured to lie at a height variable with respect to said sea floor and optionally is configured to float on the water in such a way to assume a height variable with respect to said sea floor and wherein the energy recovery device is configured to generate electric power from the wave motion and/or by height difference with respect to the sea floor by relative movement with respect to said body.

8. The device according to claim 1, further comprising an intermediate or separating element, positioned in an intermediate position of the cavity of the body, and having at least a portion of junction in contact with the lateral wall, said intermediate or separating element being configured to divide said cavity realizing the desalination chamber and the condensation chamber, said intermediate or separating element comprising at least a through hole configured to allow the passage of at least a steam deriving from the heating of the water to desalinate from the desalination chamber to the condensation chamber, said intermediate or separating element comprising at least a collection portion of desalinated water.

9. A method for water desalination, comprising:

a creation of vacuum inside a cavity of a body of a water desalination device by means of a vacuum pump operatively connected with said cavity, the introduction of a determined quantity of water to desalinate in said cavity, said cavity constituting a desalination chamber;

the heating of the water to desalinate through a heater comprising a duct, said heating comprising making seawater flow into said duct, wherein the heating comprises a supply within said heater of seawater withdrawn at a first temperature in such a way that the water to desalinate contained within said desalination chamber can evaporate forming a steam deriving from the heating of the water to desalinate, said supply taking place by means of a first supply device, the condensation of the steam deriving from the heating of the water to desalinate through a cooling induced by a cooler comprising a duct within which is, in use, seawater is made flow, wherein the condensation comprises a supply within said cooler of seawater withdrawn at a second temperature lower than the first temperature, said supply taking place through a second supply device, said condensation determining a collection of desalinated water in a collection portion of desalinated water of the water desalination device;

the method comprising a power recovery from the wave motion and/or by difference of height with respect to a sea floor through an energy recovery device operatively connected with, and supplying electric power to, the first supply device.

10. The method according to claim 9, wherein the heating comprises supplying into said heater seawater withdrawn at a first depth such that the seawater has said first temperature, and wherein the condensation comprises supplying into said cooler seawater withdrawn at a second depth such that the seawater has said second temperature lower than the first temperature.

11. The method according to claim 9, wherein the supply of seawater within said heater and/or within said cooler comprises an activation of at least a pump configured to supply the seawater within the duct of the heater and/or within the duct of the cooler, optionally wherein the supply of seawater within said heater comprises the activation of a first pump and the supply of seawater within said cooler comprises the activation of a second pump, and wherein the collection portion is positioned within the cavity, the condensation of the steam deriving from the collection of desalinated water causing a collection of desalinated water in the collection portion of desalinated water present in a condensation chamber of said cavity.

12. The method according to claim 9, wherein the power recovery from the wave motion and/or by difference of height with respect to a sea floor through an energy recovery device operatively connected with, and supplying electric power to the first supply device and the second supply device.

13. The method according to claim 12, comprising a relative movement between said body and said energy recovery device, to generate electric power from the wave motion by relative movement with respect to said body, said relative movement being caused by an anchoring of the energy recovery device to the sea floor; wherein, due to said anchoring, the energy recovery device lies at a predetermined height with respect to said sea floor and the relative movement is caused by a height variability assumed by the energy recovery device with respect to said sea floor;

or wherein the relative movement is caused by an anchoring of the body with the sea floor; wherein the body lies at a predetermined height with respect to said sea floor and the relative movement is caused by a height variability assumed by the energy recovery device with respect to said sea floor.

14. The method according to claim 9, wherein the heating of the water to desalinate causes the passage of the steam deriving from the heating of the water to desalinate through an intermediate or separating element, positioned in an intermediate position of the cavity of the body, and having at least a portion of junction in contact with said lateral wall, said intermediate or separating element being configured to divide said cavity realizing the desalination chamber and the condensation chamber, causing the passage of the steam of condensation in at least one through hole of the intermediate or separating element determining the passage of the steam deriving from the heating of the water to desalinate from the desalination chamber to the condensation chamber, wherein the steam deriving from the heating of the water to desalinate is collected in a collection portion of desalinated water of the intermediate or separating element.

* * * * *